United States Patent [19]

Cuffiani et al.

[11] Patent Number: 5,300,470
[45] Date of Patent: Apr. 5, 1994

[54] COMPONENTS AND CATALYSTS FOR THE POLYMERIZATION OF ETHYLENE

[75] Inventors: Illaro Cuffiani; Umberto Zucchini, both of Ferrara, Italy

[73] Assignee: Himont Incorporated, Wilmington, Del.

[21] Appl. No.: 914,245

[22] Filed: Jul. 15, 1992

[30] Foreign Application Priority Data
Jul. 15, 1991 [IT]  Italy .................. MI 91 A 001961

[51] Int. Cl.$^5$ .............................................. C09F 4/60
[52] U.S. Cl. ................................. 502/110; 502/103; 502/104; 502/111; 502/119; 502/125; 502/126; 502/127; 502/133; 502/134
[58] Field of Search ............... 502/103, 104, 110, 111, 502/119, 125, 126, 127, 133, 134

[56] References Cited

U.S. PATENT DOCUMENTS

| | | | |
|---|---|---|---|
| 3,135,809 | 6/1964 | Bosmajian | 502/114 |
| 4,098,979 | 7/1978 | Maemoto et al. | 502/120 |
| 4,218,339 | 8/1980 | Zucchini et al. | 252/429 B |
| 4,296,223 | 10/1981 | Berger | 526/125 |

FOREIGN PATENT DOCUMENTS 1124448  5/1982  Canada .

Primary Examiner—Patrick P. Garvin
Assistant Examiner—Brent M. Peebles

[57] ABSTRACT

Solid catalyst components for the preparation of catalysts capable of producing polymers and copolymers of ethylene with ultra high molecular weight are obtained in the form of particles having an average diameter of less than 10 micrometers, by way of reaction, in the presence of $H_2O$, between:

1) a liquid obtained by reacting:
   A) a titanium compound containing at least one Ti—OR bond, where R is a $C_1$-$C_{20}$ alkyl, $C_3$-$C_{20}$ cycloalkyl, or $C_6$-$C_{20}$ aryl radical; with
   B) a magnesium compound selected from the group consisting of: halides; compounds comprising at least one —OR or—OCOR group bonded to the magnesium, where R is a $C_1$-$C_{20}$ alkyl, $C_3$-$C_{20}$ cycloalkyl, or $C_6$-$C_{20}$ aryl radical; organometallic compounds; products of the reaction between the above mentioned compounds and electron-donor compounds; and
2) a compound or composition capable of halogenating and optionally reducing (A).

15 Claims, No Drawings

COMPONENTS AND CATALYSTS FOR THE POLYMERIZATION OF ETHYLENE

FIELD OF THE INVENTION

The present invention concerns components of catalysts in the form of very fine particles, and the catalysts derived therefrom. Said catalysts are capable of producing polymers and copolymers of ethylene having ultra high molecular weight, in the form of powder, which can be used directly for compression molding processes, and, more generally, for the manufacturing processes typical of polymers with very high, e.g., ultra high, molecular weight, as will be defined below.

BACKGROUND OF THE INVENTION

In the art it is already known, particularly from U.S. Pat. Nos. 4,218,339 and 4,296,223, how to prepare solid catalyst components by way of reaction, in various combinations, between:
A) a titanium alcoholate or a titanium halogen alcoholate (i.e., haloalcoholate);
B) a magnesium halide, or a magnesium organic or organometallic compound, or their reaction products with an electron-donor compound;
C) a compound or composition capable of halogenating and optionally reducing compound (A).

When said catalyst components are activated with an aluminum alkyl compound, they produce catalysts which are active in the (co)polymerization of α-olefins, and in particular of ethylene.

Moreover, with said catalyst components, and particularly with those described in U.S. Pat. No. 4,218,339, one can obtain homopolymers of ethylene with a narrow molecular weight distribution.

In the case of copolymers of ethylene with α-olefins, the catalyst components of the above mentioned types allow one to obtain physico-mechanical properties which are very high when compared to the low comonomer content, as described in published European patent application 7647.

Said results can be attributed to a particularly good distribution of the comonomer in the polymer chains.

One of the preferred techniques for the preparation of said catalyst components consists in causing them to precipitate from a liquid phase (either using the reagents as such, when possible, or in solution), under particular mixing conditions, in order to obtain particles with a morphology as regular as possible, and a controlled particle size distribution.

The catalysts deriving from catalyst components obtained in such a manner, due to the well known phenomenon of morphologic replica on the part of the polymer (wherein the morphology of the polymer particle substantially replicates that of the catalyst particle), allow one to obtain polymers in the form of particles with a regular and controlled morphology and high flowability.

Said polymers, therefore, have a high processability during polymerization and recovery from the polymerization reactors, and can easily be fed to the processing apparatus.

However, as indicated in published European patent application 7647, by operating with the above mentioned technique of precipitation from a liquid phase, one cannot generally obtain catalyst component particles with a diameter smaller than 10 micrometers.

When used in the (co)polymerization of ethylene, said particles produce polymers in the form of particles having a diameter from 100 to 500 micrometers, and, therefore, an average diameter well over 100 micrometers, and usually from 200 to 400 miorometers.

It is also known that in the case of α-olefin polymers, particularly ethylene, having very high molecular weight (i.e., having an intrinsic viscosity $[\eta]$ in tetralin at 135° C. higher than or equal to 10, and generally from 10 to 30 dl/g), it is particularly advantageous to have especially fine polymer powders with good compactness and flowability.

In fact, given the high viscosity that said high molecular weight polymers maintain in the molten state even at high temperatures, the standard molding processes which use melted polymer are inadequate for the manufacture of articles.

A valid solution in this case is compression molding, by which one obtains, by cohesion and compaction of the polymer powders at high temperatures, a finished product whose physico-mechanical properties generally improve the finer the particles of the initial polymer powders are, said particles having a regular form and a controlled particle size distribution. For good processability and finished product quality, it is also helpful if the polymer particles are adequately porous.

The finished products obtained from high molecular weight polyethylene are particularly suitable for a number of uses where high mechanical properties are needed (for example in the manufacture of gear parts or components for arthroprostheses)

Published European patent application 317200 describes a process for the preparation of polyethylene with ultra high molecular weight in the presence of a catalyst comprising a solid catalyst component obtained from the reaction between:
A) the reaction product of a magnesium dihalide and a titanium tetraalcoholate.
B) the reaction product of an aluminum trihalide and a silicon tetraalcoholate.

However, in spite of the fact that one of the objectives of the above process is to obtain a polymer in the form of very fine particles, the average diameter of said particles, in the examples, does not go below 195 micrometers.

Therefore, it would be an advantage if there were catalyst components of the above mentioned type in the form of very fine particles, with a regular morphology and controlled particle size distribution, capable of producing, by replica, polymer powders with good form, density and flowability characteristics, especially suitable to be used in processes for the manufacture of sheets (compression molding) or rods (ram extrusion).

This objective cannot be best reached by grinding the solid catalyst component or polymer powders, since grinding produces powders with too many different dimensions, an irregular form, and a particle size distribution which cannot be controlled. Moreover, grinding also causes a decreased consistency and porosity of the polymer particles.

Said morphologic irregularities cause poor flowability of the polymer powders, and usually a deterioration of the physico-mechanical properties of the products obtained by compression molding.

SUMMARY OF THE INVENTION

In order to satisfy the above mentioned needs, there are provided solid catalyst components for the polymerization and copolymerization of ethylene, comprising the reaction products between:
1) a liquid obtained by reacting:
   A) a titanium compound containing at least one Ti—OR bond, where R is a $C_1$-$C_{20}$ alkyl, $C_3$-$C_{20}$ cycloalkyl, or $C_6$-$C_{20}$ aryl radical optionally blended with halides or organic compounds of Zr or V; with
   B) a magnesium compound selected from the group consisting of: halides; compounds comprising at least one —OR or —OCOR group bonded to the magnesium, where R is a $C_1$-$C_{20}$ alkyl, $C_3$-$C_{20}$ cycloalkyl, or $C_6$-$C_{20}$ aryl radical; organometallic compounds; products of the reaction between the above mentioned compounds and electron-donor compounds; and
2) compound or composition capable of substituting in compound (A) at least one —OR group with a halogen atom, and optionally reducing the titanium of compound (A) to an oxidation state lower than 4, said catalyst component being in the form of particles having an average diameter smaller than 10 micrometers. In alternative embodiments, the catalyst component particle diameter is generally from 1 to 8 micrometers, preferably from 2 to 6 micrometers, including the extremes. The resulting catalyst is capable of producing, in HMT standard test for the polymerization of ethylene, which test is described hereinafter in Example 3, a polymer in particle form having an average diameter smaller than 150 micrometers, usually from 20 to less than 150 micrometers, preferably from 40 to 120 micrometers including the extremes.

Moreover, the polymer obtained with the above mentioned standard test has preferably a flowability of less than or equal to 40 seconds, measured according to ASTM 1895-69A.

In a preferred embodiment, the catalyst component of the present invention can be prepared by way of a particular precipitation process, described below, which allows one to obtain highly porous particles.

DETAILED DESCRIPTION OF THE INVENTION

Compound (A) is preferably selected from the group consisting of titanium alcoholates and titanium halogen alcoholates, where the halogen atoms are preferably chlorine or bromine. Examples of titanium alcoholates or titanium halogen alcoholates are the compounds of general formula:

$$Ti(OR)_nX_{4-n} \qquad (I)$$

where R is a $C_1$-$C_{20}$ alkyl, $C_3$-$C_{20}$ cycloalkyl, or $C_6$-$C_{20}$ aryl radical, and X is a halogen atom, preferably chlorine or bromine, $1 \leq n \leq 4$.

Specific examples of compounds of formula (I) are: $Ti(OC_2H_5)_4$; $Ti(OC_4H_9)_4$; $Ti(OC_8H_{17})_4$; $Ti(OC_6H_5)_4$; $Ti(OC_6H_{11})_4$; $Ti(OC_4H_9)_3Cl$; $Ti(OC_4H_9)_3Br$; $Ti(OC_2H_5)_3Cl_2$; $Ti(OC_4H_9)Cl_3$; $Ti(OC_6H_5)_3Cl$; $Ti(OC_4H_9)Br_3$; $Ti(O-iC_3H_7)_4$; $Ti(O-iC_3H_7)_2Br_2$; $Ti(O-iC_5H_{11})Cl_3$.

Compound (A) can also be used in a blend with halides or organic compounds of Zr or V. Specific examples of said compounds are: $VOCl_3$; $VO(OC_4H_9)_3$; $V(OC_2H_5)_3$; $V(OC_6H_5)_2Cl$; $VCl_4$; $ZrCl_4$; $Zr(OC_3H_7)_4$; $Zr(OC_6H_{13})_2Cl_2$; $Zr(OC_4H_9)_3Br$.

Compound (B) is preferably selected from the group consisting of compounds of general formula:

$$X_nMg(OR)_{2-n} \qquad (II)$$

where X is a halogen atom, preferably chlorine, or a $C_1$-$C_{20}$ alkyl, $C_3$-$C_{20}$ cycloalkyl or $C_6$-$C_{20}$ aryl radical, R is a $C_1$-$C_{20}$ alkyl, $C_3$-$C_{20}$ cycloalkyl or $C_6$-$C_{20}$ aryl radical, or a —COR' radical where R' is $C_1$-$C_{20}$ alkyl, $C_3$-$C_{20}$ cycloalkyl or $C_6$-$C_{20}$ aryl radical, and n is a number from 0 to 2;

$$RMgX \qquad (III)$$

where X is a halogen atom, preferably chlorine, and R is a $C_1$-$C_{20}$ alkyl, $C_3$-$C_{20}$ cycloalkyl or $C_6$-$C_{20}$ aryl radical.

As previously stated, it is also possible to use as compound (B) the product of the reaction, or of complexing, of the above compounds with electron-donor compounds.

Specific examples of the compounds of formula (II) are: $MgCl_2$; $MgBr_2$; $Mg(OC_2H_5)Cl$; $Mg(OC_2H_5)_2$; $Mg(OC_4H_9)_2$; $Mg(OC_4H_9)Cl$; $C_6H_5Mg(OCH_3)$; $C_8H_{17}Mg(OC_6H_5)$; Mg acetate; $(C_8H_{17})_2Mg$; $(C_6H_5)_2Mg$; $(C_6H_{11})_2Mg$.

Specific examples of compounds of formula (III) are: $CH_3MgCl$; $C_2H_5MgBr$; $C_2H_5MgCl$; $C_4H_9MgCl$; $C_4H_9MgBr$.

Examples of electron-donor compounds that can be used for the preparation of (B) are alcohols, ethers, carboxylic acids, esters, aldehydes, ketones, silanols, polysiloxane and silanes.

The silanols are preferably selected from the compounds of formula:

$$R_nSi(OH)_{4-n} \qquad (IV)$$

where n is 1, 2 or 3, and R is hydrogen, or a $C_1$-$C_{20}$ alkyl, $C_3$-$C_{20}$ cycloalkyl, or $C_6$-$C_{20}$ aryl radical. The polysiloxanes are preferably selected from compounds containing the $$-\underset{\underset{R'}{|}}{\overset{\overset{R}{|}}{Si}}O-$$

monomeric unit, where R can be equal or different from R', and R is a $C_1$-$C_{20}$ alkyl, $C_6$-$C_{20}$ aryl, alcoxyl, aryloxyl radical; R' is hydrogen, a halogen atom, preferably chlorine, or a $C_1$-$C_{20}$ alkyl, $C_3$-$C_{20}$ cycloalkyl, or $C_6$-$C_{20}$ aryl radical.

Specific examples of electron-donor compounds are $C_2H_5OH$; $C_4H_9OH$; $C_8H_{17}OH$; $C_6H_5OH$; $(C_6H_5OH)$; $(C_6H_5)_2O$; $(C_4H_9)_2O$; $C_4H_8O$; $CH_3$—O—$CH_2$—$CH_2$—$CH_2$—$OCH_3$; $CH_3$—O—$CH_2$—$C(i$—$C_3H_7)_2$—$CH_2$—$OCH_3$; $CH_3COOH$; $CCl_3COOH$; $C_6H_5COOC_2H_5$; $CH_3$—$C_6H_4$—$COOCH_3$; $C_6H_4(COOC_4H_9)_2$; $C_6H_5Si(OC_2H_5)_3$; $C_6H_5SiCH_3(OCH_3)_2$; $(CH_3)_2Si)OCH_3)_2$; $(C_6H_5)_2Si(OH)_2$; diphenyl disiloxane.

Component (2) is made up of one or more compounds having a halogenating and optionally a reducing effect, in the sense specified above, towards compound (A).

Preferably component (2) has both a halogenating and a reducing effect.

Particularly useful as component (2), alone or mixed with other compounds, are the silicon compounds containing halogens and optionally hydrogen (the silicon compounds containing hydrogen have also a reducing effect).

Examples of said compounds are: the compounds of formula $SiX_{4-n}Y_n$, where X and Y are halogen atoms, and n is a number from 0 to 3, such as $SiCl_4$; the chlorosiloxanes of formula $Si_nO_{n-1}Cl_{2n+2}$, where n is a number from 2 to 7, such as $Si_2OCl_6$ for example; halogenated polysilanes of formula $Si_nX_{2n+2}$, where X is a halogen, and n is a number from 2 to 6, such as $Si_4Cl_{10}$ for example; halosilanes of formula $SiH_{4-n}X_n$, where X is a halogen, and n is a number from 1 to 3, such as $SiHCl_3$ for example; alkyl-halosilanes of formula $R_nSiH_xX_y$ where R is a $C_1-C_{20}$ aliphatic or aromatic radical, X is a halogen, n is a number from 1 to 3, x is a number from 0 to 2, and y is a number from 1 to 3, such as $C_2H_5SiCl_3$, $CH_3SiCl_2H$, and $(CH_3)_3SiCl_2$ for example; halogenated alkoxysilanes of formula $Si(OR)_{4-n}X_n$ where X is halogen, R is a $C_1-C_{20}$ alkyl or aryl radical, and n is a number from 1 to 3, such as $Si(OC_2H_5)Cl_3$ for example.

Examples of compounds having a reducing effect which can be used in combination with a halogenating compound are: Na-alkyls; Li-alkyls; Zn-alkyls, and the corresponding aryl derivatives; the Na+alcohol system; NaH; LiH. Silicon compounds particularly effective are the polyhydrosiloxanes whose monomeric unit has the following general formula:

where R is hydrogen, halogen, $C_1-C_{10}$ aryl, alkoxyl, aryloxyl, or carboxyl group, and n varies from 2 to 1000, preferably from 3 to 100.

When the halogen atoms are present in all the above mentioned compounds, they are preferably Cl or Br.

Examples of polyhydrosiloxanes are: $(CH_3)_3SiO[(CH_3)HSiO]_nSi(CH_3)_3$; $(CH_3HSiO)_4$.

The hydrogen atoms in the above mentioned polyhydrosiloxanes can be partially substituted by methyl groups.

Other silicon compounds which can be used as reducing compounds are: silanes of formula $Si_nH_{2n+2}$ where n is a number greater than or equal to 1, preferably greater than or equal to 3, such as $Si_3H_8$; polysilanes containing the $(SiH)_x$ group, where $x \geq 2$; alkyl or arylsilanes of formula $R_xSiH_{4-x}$, where R is an allyl or an aryl, and x is a number from 1 to 3, such as $(C_6H_5)_3SiH$; alkoxy- or aryloxy-silanes of formula $(RO)_xSiH_{4-x}$ where R is a $C_1-C_{20}$ alkyl or $C_6-C_{20}$ aryl radical, and x is a number from 1 to 3, such as $(C_2H_5O)_3SiH$ for example.

Other examples of compounds which can be used for component (2) are: $VCl_4$; $VOCl_3$; $TiCl_4$; di- or trihalogentitanium alcoholates already exemplified as compounds (A); $AlCl_3$; $Al(C_2H_5)Cl_2$; $Al(C_4H_9)_2Cl$; $Al(i-C_4H_9)_3Cl_3$; $Al(C_3H_7)Br_2$; $SnCl_4$; $C_6H_5CCl_3$; $C_6H_5COCl$; $Cl_3CCOCl$; $Cl_3CCOOC_2H_5$; $SOCl_2$.

Among the latter compounds, only the aluminum organometallic compounds have a reducing effect.

A preferred example of component (2) is made up of the combination of $SiCl_4$ and a polyhydrosiloxane.

As previously stated, the catalyst components of the present invention are prepared by way of a particular process, which makes up an additional embodiment of the present invention, said process comprising:

the reaction between compounds (A) and (B), resulting in a liquid reaction product (optionally a solution);

the subsequent reaction, under agitation, of the liquid product thus obtained with (2);

in which process is added water, in amount not greater than 0.5 moles per mole of titanium compound, to one or more of the above reagents, excluding compound (B), the (A) compounds containing halogens and the halogenated compounds present in (2), either during or after reaction between (A) and (B), but before the reaction product of (A)+(B) contacts the halogenated compounds present in (2).

In many cases the reaction of compound (A) with compound (B) forms a liquid product at reaction temperature and pressure, or at any rate a product which is soluble in aliphatic, cycloaliphatic, or aromatic hydrocarbons, such as isobutane, pentane, hexane, cyclohexane, and toluene.

In some cases, in order to obtain a soluble product it may be beneficial, or necessary, that compound (B) be added to compound (A) in the presence of an excess of an electron-donor compound of the types described above.

Even if the reaction product between compounds (A) and (B) is liquid, it may be best to dilute it with a hydrocarbon solvent of the types described above.

The solvents can be present in the reaction blend in variable quantities, preferably from 1:1 to 1:4 by volume with respect to the total volume of (A)+(B).

The reaction product of (A)+(B), optionally in solution as described above, is then contacted, under agitation, with component (2).

Preferably, component (2) is added to the reaction product of (A)+(B) dropwise.

Component (2) can also be used in solution of hydrocarbon solvents of the types described above.

When component (2) comprises more than one compound (a halogenating one and a reducing one for example), it is also possible to react each of the above mentioned compounds separately with the reaction product of (A)+(B).

The temperature at which reactions are carried out is preferably from 0° to 250° C., more preferably from 20° to 200° C.

The operation can occur at atmospheric pressure or higher.

Compounds (A) and (B) are preferably caused to react in quantities which will give a Ti/Mg g-atom ratio from 0.02 to 20, more preferably from 0.1 to 3, while component (2) is preferably used in quantities which will give from 0.5 to 100, more preferably from 1 to 30 g-atom of halogen per g-atom of titanium, and from 0.1 to 100, more preferably from 0.5 to 20 g-equivalent of reducing compound per g-atom of titanium.

The water is added, following the method described above, in a molar ratio, with respect to the titanium, preferably from 0.1 to 0.5, more preferably from 0.1 and 0.3, extremes included.

How the water is added is not crucial; generally it is added dropwise while agitating.

Operating according to the methods described above, one obtains a catalyst component in the form of spheroidal particles with controlled particle size distribution. Generally, the particles have an average diameter smaller than 10 micrometers; alternatively, the catalyst component particle diameter is generally from to 8 micrometers, preferably from 2 to 6 micrometers, including the extremes. For example, by operating under the above conditions it is possible to obtain catalyst component particles having such a particle size distribution that the ratio $$\frac{(D90 - D10)}{D50}$$

is from 1 to 0.5.

In the above expression, D90, D10, and D50 are the values of diameters comprising, respectively, 90%, 10%, and 50% of the particles.

The polymer obtained with the above mentioned standard test has preferably a flowability of less than or equal to 40 seconds, measured according to ASTM 1895-69A.

Moreover, depending on the method used for adding the water, one obtains in the solid catalyst component of the present invention, a relatively high porosity, generally greater than about 0.8 cm$^3$/g, and varying preferably from about 1 to 3.5 cm$^3$/g, more preferably from about 1.2 to 3 cm$^3$/g (measured with the mercury absorption method). The surface area generally varies from about 5 to 70 m$^2$/g.

It must be remembered that when measuring the porosity by mercury absorption following common techniques, the value obtained includes the volume of the voids between the particles.

It is possible to estimate the real porosity of the particles of the catalyst component by subtracting from the total porosity volume the volume of the pores having a diameter greater than a set value, which, depending on the morphology of the particles being analyzed, presumably corresponds to the voids between the particles.

The estimated actual porosity concerning the catalyst components of the present invention varies preferably from 0.1 to 1.5 cm$^3$/g.

The same correction can be used to calculate the actual surface area. However, as will be shown in the examples, the correct values obtained with this method do not differ substantially from the ones for the total surface area, i.e., the area comprising the voids between particles.

The above mentioned 5 to 70 m$^2$/g range, therefore, can be attributed to the actual surface area.

The above mentioned porosity constitutes a further advantage for the purpose of this invention, since it increases the polymerization yield of the catalyst and allows one to obtain, by morphologic replica, polymer particles which are also porous, and are, therefore, particularly useful in processes for the production of sheets.

It has been found that in the case when the water is added directly to compound (B), the surface area and porosity of the catalyst component are particularly low, while the average diameter of the particles usually exceeds 10 micrometers.

Therefore, adding water to component (B) presents no advantages.

It is also not advantageous to add water to compounds (A) which contain halogens, as well as to the halogenated compounds present in component (2). Preferably, the water is added to compound (A) or to the reaction product of (A)+(B).

The catalyst components of the present invention, together with an organic compound of aluminum, preferably an alkyl compound of aluminum, form active catalysts for the polymerization of ethylene by itself, or in combination with higher α-olefins.

Examples of alkyl aluminum compounds are Al(C$_2$H$_5$)$_3$ and Al(i-C$_4$H$_9$)$_3$.

The organic aluminum compound is generally used in quantities from 0.1 to 1000 moles per mole of titanium compound. The organic aluminum compound can also be used together with an electron donor compound, such as a carboxyl acid ester, for example.

As previously stated, the catalyst components of the present invention are capable of producing, in HMT standard ethylene polymerization test (described in Example 3), a polymer in particle form having an average diameter smaller than 150 micrometers.

The particle size distribution and average diameter of the catalyst component are determined by way of laser light diffraction, using a Malvern Instrument 2600 apparatus.

The particle size distribution and average diameter of the polymer are determined by screening, using screens with increasingly smaller mesh.

The average diameter is the diameter under which 50% by weight of the particles are comprised.

Examples of ultra high molecular weight ethylene polymers which can be obtained with the catalysts obtained from the catalyst components of the present invention are, besides the homopolymers, the ethylene copolymers with small quantities of C$_3$-C$_{10}$ α-olefins, such as propylene, 1-butene, 1-hexene, 4-methyl-1-pentene, 1-octene.

As previously stated, said polymers and copolymers with ultra high molecular weight are characterized by an intrinsic viscosity [η] in tetralin at 135° C., which is higher than or equal to 10 dl/g, preferably from 10 to 25 dl/g.

The catalyst components of the present invention are preferably used in suspension polymerization processes.

As the suspension medium, one can use an aliphatic, cycloaliphatic, or aromatic hydrocarbon solvent, such as n-heptane, pentane, hexane, or toluene, for example.

The preferred operating conditions are:
ethylene pressure=5–20 atm;
temperature=50°–85° C.;
polymerization time=1–5 hours.

The comonomers can be added also in the liquid state. The operation is carried out in the absence of molecular weight regulators, or in the presence of reduced quantities of same, particularly of hydrogen.

Obviously, one can use, when required, two or more polymerization stages with conditions which differ, for example, in temperature and hydrogen concentration.

The following examples are given in order to illustrate and not limit the present invention.

EXAMPLES 1 AND 2, AND COMPARATIVE EXAMPLES 1 AND 2

275 g of Ti(OC$_4$H$_9$)$_4$ and 36 g of anhydrous MgCl$_2$ are introduced at 25° C. into a 2 liter glass reactor equipped with heating jacket and a mechanical agitator which has two sets of SEM type blades and three baffles positioned at 120° angles.

The temperature is then brought to 140° C., and the content is kept under agitation for 5 hours. This results into a liquid phase which is then cooled to 90° C. and diluted with 530 cm$^3$ of heptane.

Afterwards, the content is cooled to 50° C., and, while the liquid is kept under agitation at 800 rpm, 148 cm$^3$ of BAYSILON MH 15 polymethylhydrosiloxane marketed by BAYER are introduced in two hours; subsequently, in 3.5 hours, 152 cm$^3$ of SiCl$_4$ are also added.

The temperature is then increased to 60° C. in 30 minutes, and the content is maintained under agitation for 2 hours.

The red solid thus formed is separated from the liquid phase, washed with hexane until the chlorine ion is completely removed from the filtrate, then dried in a 50° C. oven for 3 hours under vacuum.

In Example 1, 2 cm$^3$ of water are added to the Ti-(OC$_4$H$_9$)$_4$ before introducing the MgCl$_2$.

In Example 2, 2 cm$^3$ of water are added after the dilution with heptane and before adding the BAYSILON.

In comparative Example 1 (identified as comp.1), the magnesium chloride is previously hydrated, causing it to absorb homogeneously 2 g of water. No water is used in comparative Example 2 (comp.2).

The characteristics of the catalyst components thus obtained are set forth in Table 1.

In particular, the porosity and surface area are calculated by introducing a known quantity of catalyst component in a dilatometer, filling the latter with mercury, and using a mercury "Porosimeter 2000" marketed by C. Erba Instruments to obtain the measurements.

In order to achieve the correct porosity and surface area values, there was subtracted the contribution of the pores having a diameter larger than 0.1 μm for the catalyst components of Examples 1 and 2, and larger than 0.2 and 0.5 μm respectively, for the components of comparative examples 1 and 2.

Said polyethylene, submitted to the Charpy resilience test following the methods described below, gave a value of 123.9±7 mJ/mm$^2$.

EXAMPLE 4

The operation is performed as in Example 3, using 0.0154 g of the catalyst component of Example 1, and carrying out the polymerization in two consecutive stages.

In the first stage the ethylene pressure is maintained at 6 bar and the temperature at 55° C. for 120 minutes.

In the second stage the ethylene pressure is maintained at 10 bar and the temperature at 75° C. for 30 minutes.

379 g of ultra high molecular weight polyethylene are obtained. The characteristics of said polyethylene are set forth in Table 2.

EXAMPLE 5

The operation is performed as in Example 3, using 0.0157 g of the catalyst component of Example 2, and carrying out the polymerization in two consecutive stages.

In the first stage the ethylene pressure is maintained at 6 bar, and the temperature at 60° C. for 90 minutes.

In the second stage the ethylene pressure is maintained at 10 bar, and the temperature at 80° C. for 150 minutes.

445 g of ultra high molecular weight polyethylene are obtained. The characteristics of said polyethylene are set forth in Table 2.

TABLE 1

| Ex. No. | ANALYSES (% WEIGHT) | | | | | | | POROSITY (cm$^3$/g) | | SURFACE AREA (m$^2$/g) | | AVG. DIA. (μm) |
|---|---|---|---|---|---|---|---|---|---|---|---|---|
| | Ti | Ti$^{3+}$ | Mg | Cl | Si | BuOH | Solv | Tot. | Corr. | Tot. | Corr. | |
| 1 | 11.8 | 9.7 | 6.45 | 36.5 | 6.86 | 25.5 | 1.3 | 1.35 | 0.199 | 13.1 | 13 | 4.97 |
| 2 | 12.35 | 11.35 | 6.85 | 39.2 | 7 | 26.6 | 0.7 | 1.9 | 0.12 | 13.7 | 13.5 | 5.78 |
| Comp. 1 | 12.5 | 10 | 7.5 | 39 | 5 | 25.3 | 1.2 | 0.75 | 0.08 | 6.5 | 6.2 | 10.4 |
| Comp. 2 | 15.55 | 13.95 | 6.5 | 40.1 | 2.7 | 30.1 | 2.1 | 1.0 | 0.088 | 17.9 | 17.2 | 14.2 |

Notes:
BuOH = C$_4$H$_9$OH
Solv = Solvent; Tot. = Total; Corr. = Correct;
Avg. Dia. = Average Diameter

EXAMPLE 3

Standard Ethylene Polymerization Test

In a 2.5 liter temperature controlled steel reactor equipped with agitator and heating jacket, are introduced, in light nitrogen flow, 950 cm$^3$ of a 1.5 millimolar solution of Al(C$_2$H$_5$)$_3$ in hexane. Ethylene is then introduced at a pressure of 6 bar, as well as 0.02 g of catalyst component suspended in 50 cm$^3$ of the above solution of Al(C$_2$H$_5$)$_3$ in hexane.

The polymerization continues at 60° C. for 180 minutes, maintaining the ethylene pressure at 6 bar.

At the end of the polymerization the nonreacted monomer is removed, and the polymer is recovered by filtration, after which it is dried at 70° C. in nitrogen for 5 hours.

By using the catalyst component of Example 1 in the above mentioned standard test, 378 g of polyethylene with a ultra high molecular weight, and having the characteristics set forth in Table 2 are obtained.

COMPARATIVE EXAMPLE 3

The operation is performed as in Example 4, using 0.0159 g of catalyst component prepared in comparative example 2, and carrying out the first polymerization stage for 135 minutes, and the second for 15 minutes.

398 g of very high molecular weight polyethylene are obtained. The characteristics of said polyethylene are set forth in Table 2.

TABLE 2

| Ex. No. | [η] dl/g | TBD g/cm$^3$ | PBD g/cm$^3$ | FLOWABILITY sec. |
|---|---|---|---|---|
| 3 | 10.9 | 0.42 | 0.37 | 20 |
| 4 | 10.8 | 0.41 | 0.36 | 30 |
| 5 | 11 | 0.38 | 0.32 | 36 |
| Comp. 3 | 13.9 | 0.38 | 0.3 | does not flow |

Notes:
[η] = intrinsic viscosity in tetrahydronaphthalene at 135° C.
TBD = tamped bulk density (DIN-53194)
PBD = poured bulk density (ASTM D1895/69A)

The particle size distributions of the polymers of Examples 3, 4, and 5, and comparative Example 3 were also determined using sieves with an increasingly smaller mesh; the results are shown in Table 3.

TABLE 3

| Ex. No. | PARTICLE SIZE DISTRIBUTION (% weight) Diameter (μm) | | | | | | | AVERAGE DIAMETER (μm) |
|---|---|---|---|---|---|---|---|---|
| | >425 | >250 | >150 | >106 | >75 | >45 | <45 | |
| 3 | 0 | 1.8 | 5.7 | 29.9 | 49.6 | 14.4 | 0 | 108 |
| 4 | 0 | 0.4 | 3.6 | 38 | 47.6 | 10.2 | 0.2 | 106 |
| 5 | 0 | 3 | 28.9 | 45.8 | 21.6 | 0.7 | 0 | 145 |
| Comp 3 | 8.2 | 46 | 44 | 1.8 | 0 | 0 | 0 | 292 |

Compression Molding Test

Using the polymers from Examples 3, 4, and 5, and comparative Example 3, we prepared, by way of compression molding, some 100×100 mm, 12 mm thick sample plates, operating as follows:

temperature=216° C.;

pressure=25 tons for 30 seconds; 15 ton for 10 minutes.

The plates where then allowed to cool for 7 min. at a pressure of 15 tons after which they were removed from the mold.

On the above plates we carried out the measurements set forth in Table 4.

TABLE 4

| | RESISTANCE | | ELONGATION at Break (%) DIN 58836 | ROCKWELL HARDNESS (R scale) ASTM D 785 | ABRASION (%) DIN 53516 | IMPACT CHARPY (mJ/mm) DIN 5883 |
|---|---|---|---|---|---|---|
| NORM | Yield (N/mm²) DIN 58836 | Break (N/mm²) DIN 58836 | | | | |
| Ex. No. | | | | | | |
| 3 | 22 | 38.0 | 360 | 70–72 | 3.7 | 123.9± |
| 4 | 22.2 | 40.8 | 395 | — | — | 121 ± 4 |
| 5 | 22.2 | 42.5 | 400 | 63–67 | 5.7 | 120 ± 8. |
| Comp. 3 | 22 | 35.6 | 320 | 62–68 | 6 | 89 ± 6. |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A solid catalyst component useful for the preparation of catalysts for the polymerization of ethylene and the copolymerization of ethylene with a small quantity of comonomer consisting of one or more $C_3$–$C_{10}$ alpha olefins to very high molecular weight polymers, said component comprising the reaction product of:

(1) a liquid obtained by reacting:
      (A) a titanium compound containing at least one Ti—OR bond, where R is $C_1$–$C_{20}$ alkyl, $C_3$–$C_{20}$ cycloalkyl or $C_6$–$C_{20}$ aryl; with
      (B) a magnesium compound selected from the group consisting of: (a) magnesium halides; (b) compounds comprising at least one —OR or —OCOR bonded to magnesium, where R is $C_1$–$C_{20}$ alkyl, $C_3$–$C_{20}$ cycloalkyl or $C_6$–$C_{20}$ aryl; (c) organometallic compounds; and (d) the product produced by reacting or complexing the (a), (b) or (c) compound with electron-donor compounds; and
   (2) a compound or composition capable of substituting in compound (A) at least one —OR with a halogen atom, and optionally reducing the titanium of compound (A) to a lower valence;

said catalyst component being in the form of particles having an average diameter smaller than 10 micrometers, and being capable of producing in the HMT standard test for the polymerization of ehtylene a polymer in particle form having an average diameter smaller than 150 micrometers.

2. The catalyst component of claim, 1, having a porosity, measured by mercury absorption, higher than about 0.8 cm³/g.

3. The catalyst component of claim 1, where compound (A) is selected from compounds of general formula:

$$Ti(OR)_nX_{4-n} \qquad (I)$$

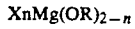

where R is a $C_1$–$C_{20}$ alkyl, $C_3$–$C_{20}$ cycloalkyl or $C_6$–$C_{20}$ aryl radical, X is a halogen atom, and $1 \leq n \leq 4$.

4. The catalyst component of claim 1, where compound (B) is a compound of the general formula:

$$X_nMg(OR)_{2-n} \qquad (II)$$

where X is a halogen atom, $C_1$–$C_{20}$ alkyl, $C_3$–$C_{20}$ cycloalkyl or $C_6$–$C_{20}$ aryl, R is $C_1$–$C_{20}$ alkyl, $C_3$–$C_{20}$ cycloalkyl, $C_6$–$C_{20}$ aryl, or —COR' where R' is $C_1$–$C_{20}$ alkyl, $C_3$–$C_{20}$ cycloalkyl or $C_6$–$C_{20}$ aryl, and $0 < n < 2$;

a compound of the general formula:

$$RMgX \qquad (III)$$

where X is a halogen atom, R is $C_1$–$C_{20}$ alkyl, $C_3$–$C_{20}$ cycloalkyl or $C_6$–$C_{20}$ aryl; or a product produced by reacting or complexing a compound of formula (II) or formula (III) with an electron-donor compound.

5. The catalyst component of claim 1, wherein said component (2) a combination of $SiCl_4$ and a polyhydrosiloxane.

6. A catalyst for the polymerization and copolymerization of ethylene comprising the product of the reaction between the catalyst component of claim 1 and an organic aluminum compound.

7. A process for the preparation of the catalyst component of claim 1, comprising:

the reaction between compounds (A) and (B), with the consequent formation of a liquid reaction product; and the subsequent reaction, under agitation, of the liquid product thus obtained with component (2);

in which process water in amount not greater than 0.5 moles per mole of titanium compound is added to one or more of the above reagents, excluding compound (B), compounds (A) containing halogens and halogenated compounds present in component (2), either during or after reaction between (A) and (B), but before the contact of the reaction product of (A)+(B) with the halogenated compounds present in component (2).

8. The process of claim 7, where the water is added to compound (A) or to the reaction product of (A)+(B).

9. The process of claim 7, where the water is added in a molar ratio from 0.1 to 0.5 with respect to the titanium.

10. Catalyst component of claim 1, wherein compound (A) further comprises a blend with halides or organic compounds of Zr or V selected from the group consisting of $VOCl_3$; $VO(OC_4H_9)_3$; $V(OC_2H_5)_3$; $V(OC_6H_5)_2Cl$; $VCl_4$; $ZrCl_4$; $Zr(OC_3H_7)_4$; $Zr(OC_6H_{13})_2Cl_2$; and $Zr(OC_4H_9)_3Br$.

11. Catalyst component of claim 3 having porosity measured by mercury absorption higher than about 0.8 $cm^3/g$.

12. Catalyst component of claim 4 having a porosity measured by mercury absorption higher than about 0.8 $cm^3/g$.

13. Catalyst component of claim 5 having a porosity measured by mercury absorption higher than about 0.8 $cm^3/g$.

14. Catalyst of claim 6 wherein said catalyst component of claim 1 has a porosity measured by mercury absorption higher than about 0.8 $cm^3/g$.

15. Catalyst component of claim 4 wherein compound (A) is selected from compounds of general formula $$Ti(OR)_nX_{4-n} \qquad (I)$$

where R is a $C_1$–$C_{20}$ alkyl, $C_3$–$C_{20}$ cycloalkyl, or $C_6$–$C_{20}$ aryl radical, X is a halogen atom and $1 \leq n \leq 4$; and wherein said component (2) is a combination of $SiCl_4$ and a polyhydrosilane; and wherein said catalyst component has a porosity measured by mercury absorption higher than about 0.8 $cm^3/g$.

* * * * *

UNITED STATES PATENT AND TRADEMARK OFFICE
CERTIFICATE OF CORRECTION

PATENT NO. : 5,300,470

DATED : April 5, 1994

INVENTOR(S) : Illaro Cuffiani et al

It is certified that error appears in the above-identified patent and that said Letters Patent is hereby corrected as shown below:

At col. 3, lines 58-59, change "$Ti-(OC_2H_5)_3Cl_2$" to --$Ti(OC_2H_5)_2Cl_2$--.

At col. 4, line 53, delete --($C_6H_5OH$;-- at end of line.

At col. 5, line 35, change "$C_1-C_{10}$ aryl," to --$C_1-C_{10}$ alkyl, a $C_1-C_{20}$ aryl,--.

At col. 6, line 68, after "from" insert --1--.

At col. 9, in Table 1, under Ex. No. 1 for Porosity Corr., change "0.199" to --0.119--.

At col. 9, line 50, insert --HMT-- before "Standard Ethylene Polymerization Test".

Signed and Sealed this

Sixth Day of September, 1994

Attest:

BRUCE LEHMAN

*Attesting Officer*   *Commissioner of Patents and Trademarks*